No. 675,596. Patented June 4, 1901.
T. W. GREEN.
JOURNAL BOX AND ADJUSTABLE BEARING THEREFOR.
(Application filed Feb. 28, 1901.)

(No Model.)

Witnesses.

Inventor.

Attorney.

United States Patent Office.

THOMAS W. GREEN, OF PHILADELPHIA, PENNSYLVANIA, ASSIGNOR TO THE WILBRAHAM BAKER BLOWER COMPANY, OF SAME PLACE.

JOURNAL-BOX AND ADJUSTABLE BEARING THEREFOR.

SPECIFICATION forming part of Letters Patent No. 675,596, dated June 4, 1901.

Application filed February 28, 1901. Serial No. 49,202. (No model.)

*To all whom it may concern:*

Be it known that I, THOMAS W. GREEN, a citizen of the United States, residing at Philadelphia, in the county of Philadelphia and State of Pennsylvania, have invented new and useful Improvements in Journal-Boxes and Adjustable Bearings Therefor, of which the following is a specification.

My invention relates to adjustable bearings for the journals of the shafts in heavy and fast-running machinery; and the object of my improvement is to provide a cheap and easily-adjusted device by means of which the center of the shaft may be quickly and accurately adjusted to its original position after the bearing or the journal, or both, may have become worn from use. To accomplish the desired result, I make the inner surface of the journal-box cylindrical in form and fit therein an adjustable bearing made in two parts or halves. The outside of the adjustable bearing is formed to a circle that is concentric with the inside of the journal-box. The inside of the bearing is cylindrical, but not concentric with its outside surface, being concentric with and fitting around the shaft-journal and adjustable up or down in the manner shown.

Figure 1:
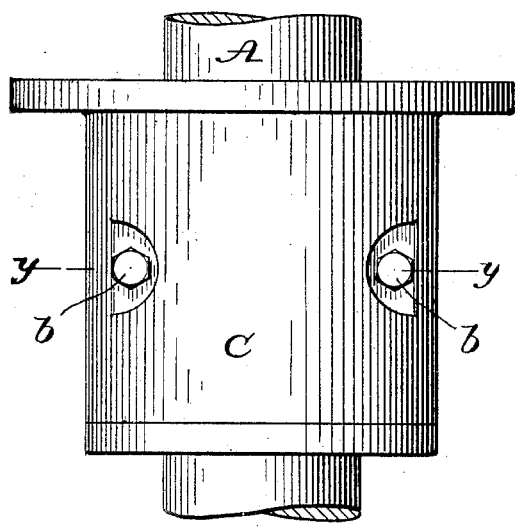
Figure 2:
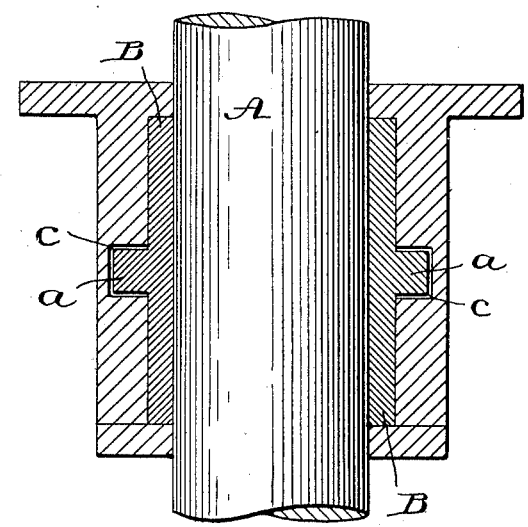
Figure 3:
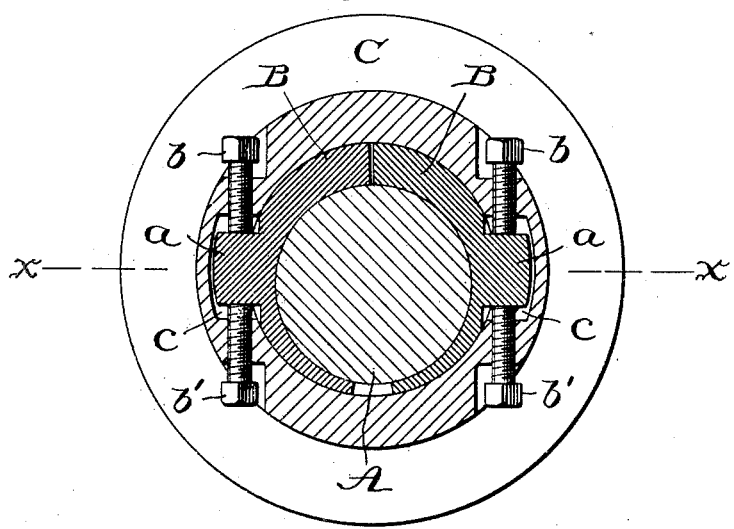

In the accompanying drawings, Figure 1 is a plan view of a journal-box having my improvement therein. Fig. 2 is a horizontal sectional view on line $x$ $x$ of Fig. 3. Fig. 3 is a vertical sectional view on line $y$ $y$ of Fig. 1.

A represents the shaft lying in the journal-box.

B B are the two parts of the eccentric adjustable bushing surrounding the shaft and secured in the journal-box C.

$a$ $a$ are lugs or extensions cast on the outside of the adjustable bushing in the position shown in Fig. 3.

$b$ $b'$ are set-screws passing through the journal-box, as shown in Fig. 3, and having their inner ends resting against the lugs $a$ $a$.

$c$ $c$ are depressions cast or otherwise formed on the inside of the journal-box C to receive the projecting lugs $a$ $a$ on the adjustable bushing.

The thick parts of the adjustable bushing B B are placed adjacent to each other at the top of the box and the thin portions at the bottom.

When constructed and fitted together in the manner shown, after the shaft-journal or the bushing has become worn from use the bushing is moved downwardly by means of the set-screws $b$ $b'$, so as to bring the lower or thin edges nearer together. This will cause the thicker portions of the adjustable bushing to come under the journal and bring the center of the shaft back to its original position, thus taking up the wear.

Having thus described my invention, what I claim as new, and desire to secure by Letters Patent, is—

1. In a journal-bearing, the combination with the journal and suitable support therefor, of a two-part bushing having its bore concentric with the journal and its outer periphery eccentric thereto, and means for adjusting said bushing to compensate for wear, as set forth.

2. In a journal-bearing, the combination with the journal and suitable support therefor, of a two-part bushing having its bore concentric with the journal and its outer periphery eccentric thereto, and separate means for adjusting each part of said bushing to compensate for wear, as set forth.

3. In a journal-bearing, the combination with the journal and a suitable bearing therefor, of a two-part bushing having its bore concentric with the journal and its outer periphery eccentric thereto, each part of said bushing being provided with outwardly-extending lugs, and adjusting means adapted to operate on said lugs, whereby the bushing may be adjusted to take up the wear, as set forth.

4. A journal-box having its inner or bearing surface cylindrical, in combination with an eccentric bushing consisting of two parts, fitting in the journal-box and having its thick ends at the upper part of the box and adjacent to each other, the bore of said bushing being concentric with the journal, and the outer surface of said bushing concentric with the inner surface of the journal-box, and independent means for adjusting each of said bushing-pieces to take up the wear, as set forth.

5. A journal-box having its inner bearing-surface cylindrical and provided with the depressions c, c, in combination with a two-piece eccentric bushing fitting within the journal-box with the thick or heavy ends lying adjacent to each other, the outer surface of the eccentric bushing being concentric with the inside of the journal-box and the inner surface of said bushing concentric with the shaft-journal, the two parts of the bushing being provided with the extending lugs a, a, and screws b, b', for adjusting the parts of said bushing, substantially as and for the purpose described.

In testimony whereof I affix my signature in presence of two witnesses.

THOMAS W. GREEN.

Witnesses:
 THOMAS D. MOWLDS,
 FRANCIS S. GINTHER.